Patented Mar. 10, 1936

2,033,182

UNITED STATES PATENT OFFICE 2,033,182

INTERMEDIATES AND DYESTUFFS OF THE ANTHRAQUINONE ACRIDONE SERIES

William Dettwyler, Milwaukee, Wis., assignor to E. I. du Pont de Nemours & Company, Wilmington, Del., a corporation of Delaware No Drawing. Application November 22, 1933, Serial No. 699,195

4 Claims. (Cl. 260—37)

This invention relates to the preparation of new Bz-omega-dichloro-methyl-anthraquinone acridones and dyestuffs prepared therefrom.

I have found that Bz-methyl-anthraquinone acridones may be chlorinated at temperatures higher than those which normally lead to ring-chlorination to give Bz-omega-dihalogen-methyl-anthraquinone acridones, which may in turn be condensed with amino compounds to give dyestuffs containing the azo-methine grouping (—CH=N—). The resulting dyestuffs dye cotton from orange to red shades, and have good fastness properties. All three isomeric Bz-methyl-acridones may be used as starting materials in this process and any of the known methods of chlorinating side chains on aromatic compounds may be substituted for the methods specifically mentioned in the following examples.

In the preparation of the dyestuff from the Bz-omega-dichloro-methyl-anthraquinone acridone, any primary aromatic amino compound may be used since the formation of the azomethine group leads to the production of a stable color grouping.

The following examples are given to more fully illustrate my invention. The parts used are by weight.

Example 1

500 parts of o-dichlorobenzene and 100 parts of Bz-para-methyl-anthraquinone acridone are heated together to 170° C. and at this temperature chlorine gas is passed in until the entire mass becomes a bright red and contains from 17½ to 25% chlorine.

The mass is then cooled to room temperature, filtered and washed with o-dichlorobenzene, then with alcohol and dried.

The Bz-omega-dichloro-methyl-anthraquinone acridone so obtained is a bright red powder, soluble in concentrated sulfuric acid with a yellow-brown solution. It dyes cotton from a violet vat a violet shade, which upon oxidation changes to a light red. This color is removed by soaping for it has little affinity for the fiber.

The compound, when containing only about 17% chlorine, has the following probable formula

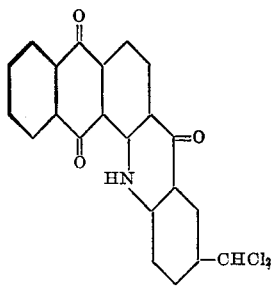

Further chlorination over about 17½% insures complete dichlorination of the methyl group, with the introduction of some chlorine in the Bz-ring.

Example 2

500 parts of o-dichlorobenzene and 100 parts of Bz-meta-methyl-anthraquinone acridone are heated to 170° C. Chlorine gas is passed into the mass at this temperature until an isolated sample contains 25% $Cl_2$.

The so-obtained Bz-chloro-Bz-meta-dichloro-methyl-anthraquinone acridone is a bright red powder and has similar properties to the product described in Example 1. This compound, which is substantially a trichloro compound, contains one atom of chlorine in the Bz-ring.

Example 3

300 parts of dry nitrobenzene, 10 parts of Bz-para-dichloromethyl-anthraquinone acridone (as obtained in Example 1) and 8 parts of 1,5-monobenzoyl-diamino-anthraquinone are heated together to 180°–185° and held at this temperature for 1 hour or until the evolution of hydrochloric acid stops. The formed dyestuff crystallizes out in orange needles. The cooled mass is filtered off, washed with nitrobenzene and alcohol. The dry dyestuff is an orange powder, soluble in concentrated sulfuric acid with a red-brown color and dyes cotton violet shades from a violet vat which upon oxidation are changed to a strong red-orange color. It has the following probable formula

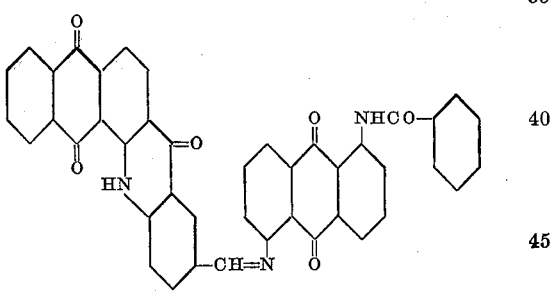

Other amino bodies of the aliphatic or aromatic series may be substituted for the 1,5-monobenzoyl-diamino-anthraquinone used in this example.

Example 4

300 parts of nitrobenzene, 10 parts of Bz-para-dichloro-methyl-anthraquinone acridone and 8 parts of 1,4-monobenzoyl-diamino-anthraquinone are heated at 180–185° until no more hydrochloric acid is liberated. After cooling to room temperature, the red crystalline mass is filtered, washed with nitrobenzene and alcohol.

The dyestuff is a red powder, soluble in concentrated sulfuric acid with a yellow-brown color and dyes cotton violet from a violet vat which upon oxidation is changed to a strong yellowish-red shade. It has the following probable formula

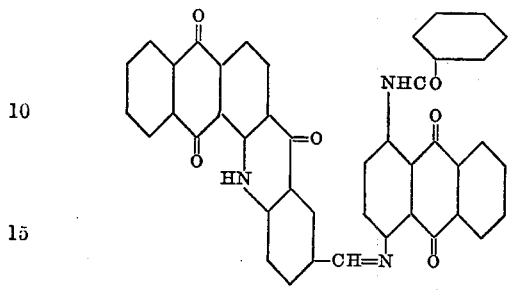

*Example 5*

200 parts of nitrobenzene, 10 parts of Bz-para-dichloro-methyl-anthraquinone acridone and 3 parts of 1,5-diamino-anthraquinone are heated at 180–185° for 1 hour. The newly formed dyestuff crystallizes out and is filtered off after cooling to room temperature. The product consists of a brown powder, soluble in sulfuric acid with a red-brown color and dyes cotton violet from a violet vat, which on oxidation is changed to an orange-red shade. It has the following probable formula

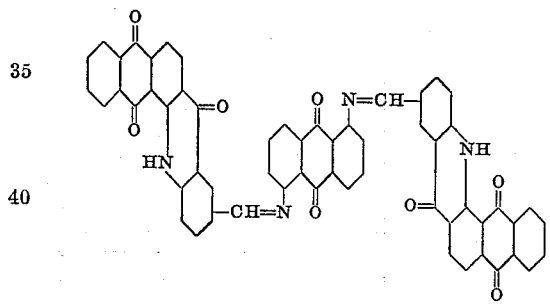

1,4- or 1,8-diamino-anthraquinone may be substituted for the 1,5-diamino-anthraquinone used in this example.

It is to be understood that my invention is not limited to the specific examples which have been given above. The anthraquinone-acridone nucleus may contain monovalent substituents without departing from the spirit of my invention, which contemplates the preparation generally of compounds of the general formula:

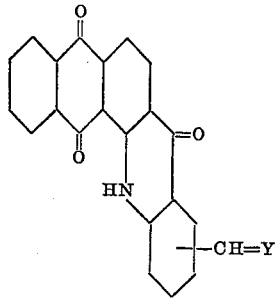

wherein Y represents two atoms of chlorine or the group =N—R, in which R represents any alkyl, aryl or aralkyl group, and the anthraquinone-acridone nucleus may contain monovalent substituents.

What I claim is:
1. Compounds of the general formula

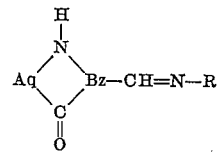

wherein Aq stands for an anthraquinone radical connected to the acridone group in the 1,2 position and wherein R represents an aryl group of the anthraquinone series.

2. A Bz-omega-dichloromethyl-anthraquinone acridone.

3. In the process for preparing Bz-azo-methine-anthraquinone acridones, the step which comprises dichlorinating a Bz-methyl-anthraquinone acridone in an inert high-boiling organic solvent at temperatures higher than those initially leading to ring chlorination under otherwise similar conditions.

4. In the process for preparing Bz-azo-methine-anthraquinone acridones, the steps which comprise dichlorinating a Bz-methyl-anthraquinone acridone in an inert high-boiling organic solvent at temperatures higher than those initially leading to ring chlorination under otherwise similar conditions and condensing the Bz-omega-dichloromethyl-anthraquinone acridone so formed with a primary amine of the anthraquinone series.

WILLIAM DETTWYLER.